US006665840B1

(12) United States Patent
Wiley et al.

(10) Patent No.: US 6,665,840 B1
(45) Date of Patent: Dec. 16, 2003

(54) SYSTEM AND METHOD FOR RUN TIME GENERATION OF POTENTIAL LABEL POSITIONS

(75) Inventors: John-Michael Wiley, Redmond, WA (US); Martin John Sedluk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/260,756

(22) Filed: Mar. 2, 1999

(51) Int. Cl.[7] .............................. G06F 15/00; G09G 5/00
(52) U.S. Cl. ........................ 715/512; 715/517; 715/526; 345/587; 345/619; 345/648
(58) Field of Search .......................... 707/512; 345/587, 345/648, 619; 715/512, 517, 526

(56) References Cited

U.S. PATENT DOCUMENTS

| | | | | |
|---|---|---|---|---|
| 5,428,733 A | * | 6/1995 | Carr | 345/660 |
| 5,684,940 A | * | 11/1997 | Freeman et al. | 345/630 |
| 5,689,717 A | * | 11/1997 | Pritt | 345/619 |
| 5,724,072 A | * | 3/1998 | Freeman et al. | 345/648 |
| 5,734,386 A | * | 3/1998 | Cosman | 345/587 |
| 5,988,853 A | * | 11/1999 | Kim et al. | 700/90 |
| 6,154,219 A | * | 11/2000 | Wiley et al. | 345/581 |

OTHER PUBLICATIONS

Edmondson etal., *A General Cartographic Labeling Algorithm*, Mitsubishi Electric Research Laboratories. Jan. 1996.
Christensen et al., *Labeling Point Features on Maps and Diagrams*. Harvard University Center for Research in Computer Technology. Jun. 1994.
Doerschler et al., *System for Dense–Map Name Placement*. Communications of the ACM, vol. 35, No. 1, pp. 70–79, Jan. 1992.
Yoeli, Pinhas. *The Logic of Automated Map Lettering*. pp. 99–108, 1972.
Freeman et al., *On the Problem of Placing Names in a Geographic Map*, pp. 121–140. 1987.
Hirsch, Stephen. *An Algorithm for Automatic Name Placement Around Point Data*. The American Cartographer, vol. 9, No. 1 pp. 5–17. 1982.

* cited by examiner

*Primary Examiner*—Joseph H. Feild
*Assistant Examiner*—Rachna Singh
(74) *Attorney, Agent, or Firm*—King & Spalding, LLP

(57) ABSTRACT

A system and method for generating multiple potential label positions for a polygon at run time, rather than selecting from pre-configured label positions. The present invention analyzes the visible portion of the polygon to generate potential label positions dynamically based on the visible portion of the polygon, rather than using pre-configured label positions. As many rectangles are created as can fit within the visible portion of the polygon, and which can support the placement of a label. The rectangles are sized in accordance with the size of the label to be displayed. Once the rectangles are created, the present invention allows for the selection of one of the rectangles as a preferred label position for the polygon. The present invention also allows for the generation of a form following baseline created by connecting the centerpoints of horizontally disposed rectangles, and then smoothing the resulting baseline until a desirable baseline is obtained. A set of rectangles are constructed along the form following baseline for the placement of the label.

20 Claims, 7 Drawing Sheets

SYSTEM AND METHOD FOR RUN TIME GENERATION OF POTENTIAL LABEL POSITIONS

TECHNICAL FIELD

The present invention relates generally to computer software application programs for creating and displaying computer-generated maps. More particularly, the present invention relates to a mapping program or software module for generating potential label positions for polygons at run time.

BACKGROUND OF THE INVENTION

Printed maps have been in existence for many centuries. However, the use of computer mapping programs to display maps has only achieved widespread acceptance in the most recent years. Today, there are many such mapping programs capable of creating and displaying a map in real-time. Mapping programs have many helpful uses, such as locating a business or home, or planning a route for a vacation.

To make a computer mapping program usable, labels must be displayed on-screen associated with important features, such as countries, cities, lakes, rivers, and the like. The developers of computer mapping programs are faced with many unique problems, one of which is the problem of placing labels on polygons displayed on a computer-generated map. Polygons are often used by mapping programs to represent areas, such as islands, lakes, large rivers, and the like. Unlike on printed maps, a polygon is sometimes only partially visible on a computer-generated map, depending on what portion of the map is currently on-screen. Unlike printed maps, it may be necessary to alter the position of a label for the polygon if less than the entire polygon is visible.

Before now, developers of mapping programs have not adequately addressed the need to move a label for a polygon depending on which part of the polygon is currently displayed. Existing mapping programs typically use a single, pre-configured position for the label of a polygon. If that label position happens to be off-screen, the label for the polygon is not displayed. The only known attempt to address this concern is to increase the number of pre-configured label positions. However, that solution typically falls short of presenting the polygon on-screen with the label in a cartographically preferable or aesthetically pleasing position.

Consequently, there is a need in the art for a system and method for dynamically generating multiple potential label positions for a polygon at run time. The potential label positions should provide the mapping application with a number of options from which to choose a preferable label position. The potential label positions should also be generated based on the visible portion of the polygon in order to achieve a more aesthetically pleasing result when displayed on the map.

SUMMARY OF THE INVENTION

The present invention meets the above described needs by providing a system and method for generating multiple potential label positions for a polygon at run time, rather than selecting from pre-configured label positions. The present invention analyzes the visible portion of the polygon to generate potential label positions dynamically based on the visible portion of the polygon, rather than by using pre-configured label positions. The present invention creates as many rectangles as can fit within the visible portion of the polygon, and which can support the placement of a label. The rectangles are sized in accordance with the size of the label to be displayed. Once the rectangles are created, the present invention allows for the selection of one of the rectangles as a preferred label position for the polygon.

In accordance with one embodiment of the present invention, the system begins by determining the outline of the polygon displayed on-screen. All of the polygon may or may not be visible. Once the outline of the polygon is determined, the system begins measuring horizontal lines in the first row of pixels within the polygon. Beginning at the leftmost pixel in the first row of pixels within the polygon, the length of a horizontal line is measured by counting the number of pixels displayed on-screen within the polygon and extending horizontally to the right from the beginning point. Likewise, the polygon itself may have an irregular shape, and the horizontal line may terminate at an edge of the polygon. Each horizontal -line in the first row of pixels is measured. The length and beginning point of each horizontal line is maintained.

Once the length and beginning point is determined for each horizontal line in the first row of pixels, the system proceeds to the second row of pixels. Again, the system determines the length and starting point of each horizontal line in the second row of pixels. This procedure is repeated until the system has determined the length and starting point for each, horizontal line in each row of pixels contained within the visible portion of the polygon.

Once each of the horizontal lines is known, the system generates potential label positions. Each potential label position is created by forming a rectangle around portions of the horizontal lines which overlap. In order to support a potential label position, a certain number of rows of pixels must contain a horizontal line. In other words, there must be enough overlap between horizontal lines in successive rows of pixels that a rectangular box can be constructed which outlines the potential label position. The number of rows necessary to support a label position is a function of the font size of the label to be displayed. For instance, a particular font size may require that fourteen rows of pixels all contain overlapping horizontal lines. Likewise, the length of the shortest horizontal line in the rectangle may determine the width of the rectangle forming the potential label position.

In this manner, several potential label positions may be generated at run time. Each potential label position is based on the portion of the polygon which is currently displayed on screen. By generating several potential label positions at run time, a preferred (most cartographically or aesthetically preferable) label position can be identified for any view of the map. Several methods to identify the preferred label position from a plurality of label positions are known to those skilled in the art, and are the subject of related patents. Once the preferred label position is identified, the label is placed on the polygon. The resulting map contains labels placed in a superior position of cartographic preference in most cases. Other aspects, benefits, and uses of the present invention will become apparent to those skilled in the art upon a reading of the following detailed description taken in conjunction with the attached drawings and appended claims.

DETAILED DESCRIPTION OF THE INVENTION

The present invention is directed to a system and method for generating multiple potential label positions for a polygon at run time, rather than selecting from pre-configured label positions. The present invention may be embodied in a mapping program, such as the "Encarta Virtual Globe" mapping program owned and licensed by the Microsoft Corporation of Redmond, Wash.

Exemplary Operating Environment

Figure 1:
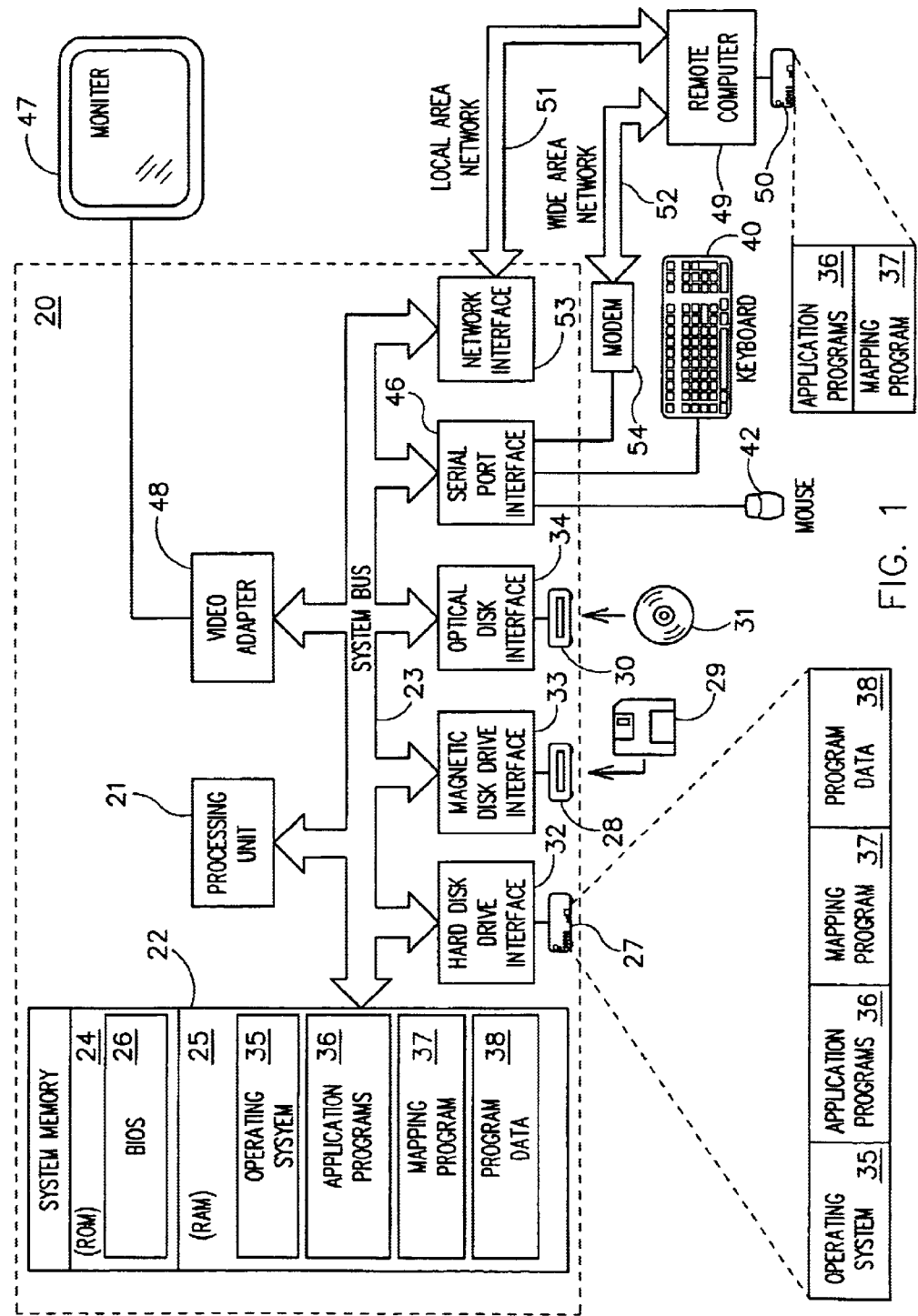
FIG. 1 is a block diagram of a conventional personal computer that provides a portion of the operating environment for an exemplary embodiment of the resent invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CAROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a computer mapping program 37 having an embodiment of the present invention, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Implementation of an Exemplary Embodiment

Figure 2:
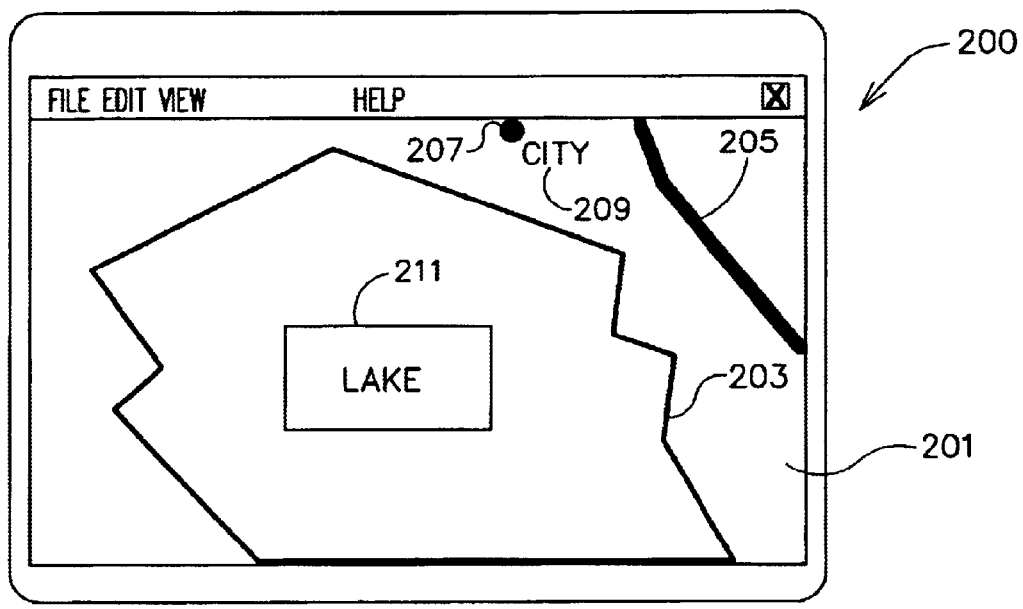
FIG. 2 is a sample screen display presented by a mapping program constructed in accordance with an exemplary embodiment of the present invention.
Figure 3:
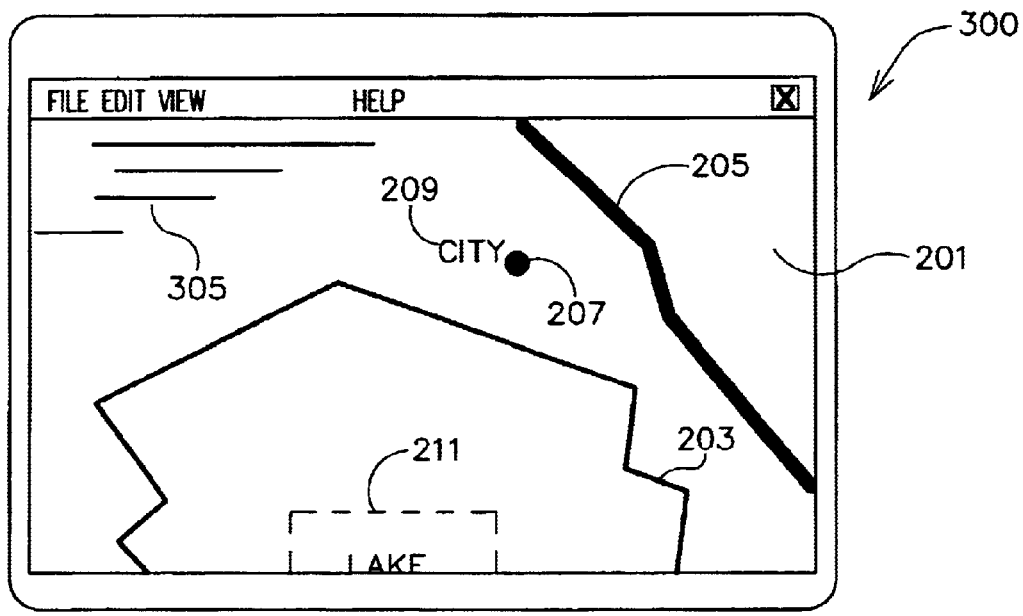
FIG. 3 depicts the sample screen display of FIG. 2 slightly translated to illustrate the generation of potential label positions.

FIGS. 2 and 3 are sample screen displays 200, 300 presented by the mapping program 37 constructed in accordance with an exemplary embodiment of the present invention. FIGS. 2 and 3 together illustrate a situation which benefits from run time generation of label positions for a polygon. To begin, the screen display 200 of FIG. 2 illustrates a sample computer-generated map 201. On the map 201 are several features such as a lake 203, a road 205, and a city 207. In the view of display 200, the city 207 is identified by the city label 209, and the lake 203 is identified by the lake label 211. The lake label 211 is currently located in a preferred label position near the center of the lake 203.

FIG. 3 illustrates another view of the map 201. In the display 300 of FIG. 3, the visible portion of the map 201 has been translated some distance to the north from the view in display 200 of FIG. 2. The change in view may be caused through user intervention, such as by selecting a new center point for the display 200. Such a selection is often done through the use of an input device such as mouse 42. In the new view of display 300, a mountain range 305 is now visible, and more of the road 205 is visible. The city 207 appears lower in the display 300, as does the lake 203. The label 209 for the city 207 has moved from the southeast position in display 200, to the northwest position in display 300 of FIG. 3.

In typical fashion for computer mapping programs, such as mapping program 37, the placement of labels for many features, such as city 207, is re-evaluated each time the view of the map 201 changes. In the disclosed example, changing the current view of the map 201 causes the mapping program 37 to select a new position for the city label 209. Through the use of one or more comparison techniques, the mapping program 37 is able to select a new, cartographicaily-preferable, position for the city label 209.

In similar manner, the position of the lake label 211 in the display 200 of FIG. 2 is no longer the preferable position in the new display 300 of FIG. 3. As can be seen in the display 300, the entire lake label 211 is not visible in the same position as display 200 of FIG. 2. In accordance with existing technologies, unless another pre-configured label position is available, the lake label 211 will simply not be displayed or will be clipped by the edge of the screen window. That is, some existing technologies don't leave the label off, but show the label in a clipped fashion as shown in FIG. 3. If pre-configured label positions are available, then the mapping program 37 may evaluate each of those positions to determine a preferable position. Unfortunately, the use of pre-configured label positions for the lake label 211 will often not achieve a desirable result due to the limitations of only having a few potential label positions as previously discussed. In accordance with the disclosed embodiment, a new position for the lake label 211 is selected from multiple potential positions dynamically generated when the view changes from the display 200 of FIG. 2 to the display 300 of FIG. 3.

Figure 4:
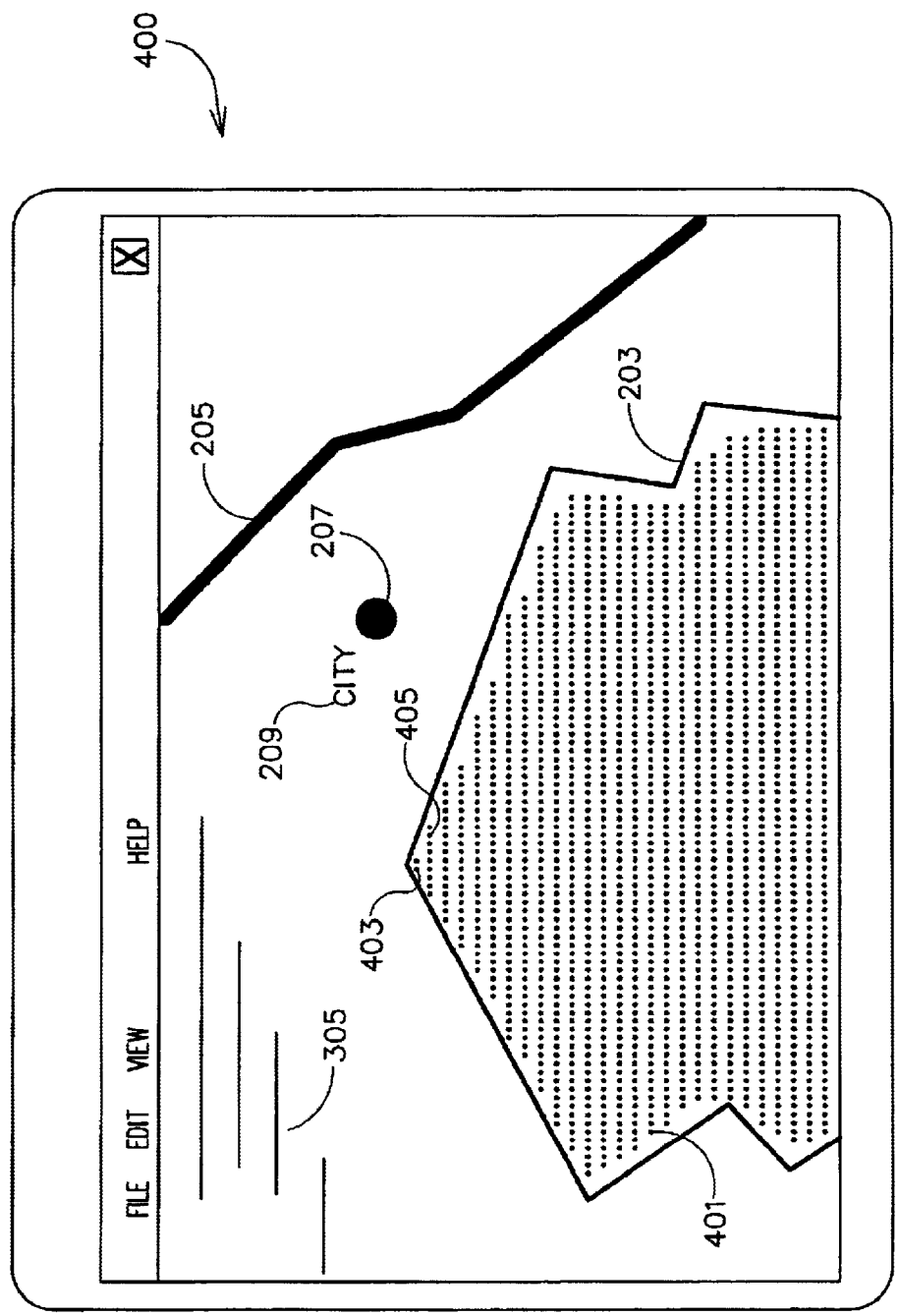
FIG. 4 illustrates the initial procedure, measuring horizontal lines on rows of pixels, of one embodiment of the present invention for generating potential label positions for a polygon.

FIG. 4 is another sample screen display 400 presented by the mapping program 37 constructed in accordance with this embodiment of the present invention. FIG. 4 illustrates the initial procedure for dynamically generating potential label positions for the lake 203. Visible are the lake 203, the road 205, the city 207, the city label 209, and the mountain range 305. A new label has not yet been placed on the lake 203. Those skilled in the art will appreciate that the lake 203 is represented by one or more polygon shapes, and each of the polygons forming the lake 203 are located as part of the initial procedure.

In the display 400 of FIG. 4, each pixel within the lake 203 is represented by a dot, such as pixel 401. Those skilled in the art will appreciate that actual pixels are much smaller and more numerous than those illustrated in display 400. However, the pixels illustrated in display 400 are intentionally shown enlarged for clarity and simplicity of discussion only.

To generate potential label positions for the lake 203, the mapping program 37 begins at the uppermost and leftmost pixel (as displayed) pixel 403 and measures a horizontal line across the width of the lake 203. Starting at pixel 403, the mapping program 37 measures a horizontal line from the leftmost edge of the lake 203 to the rightmost edge. The mapping program 37 maintains the length and starting point of the first horizontal line. The mapping program stores that information in memory 22. Then the mapping program 37 increments to the next row of pixels 405 below the uppermost pixel 403. Again beginning at the leftmost edge of the lake 203, a line is measured horizontally across the lake 203. The mapping program 37 again stores the length and starting point of the second row of pixels 405 in memory 22. The mapping program continues measuring the horizontal lines at each row of pixels within the lake 203 until all the horizontal lines are measured. When all the rows of pixels are examined, the mapping program 37 has a listing of the starting points and lengths of the horizontal lines on each row of pixels within the boundaries of the lake 203.

Figure 5:
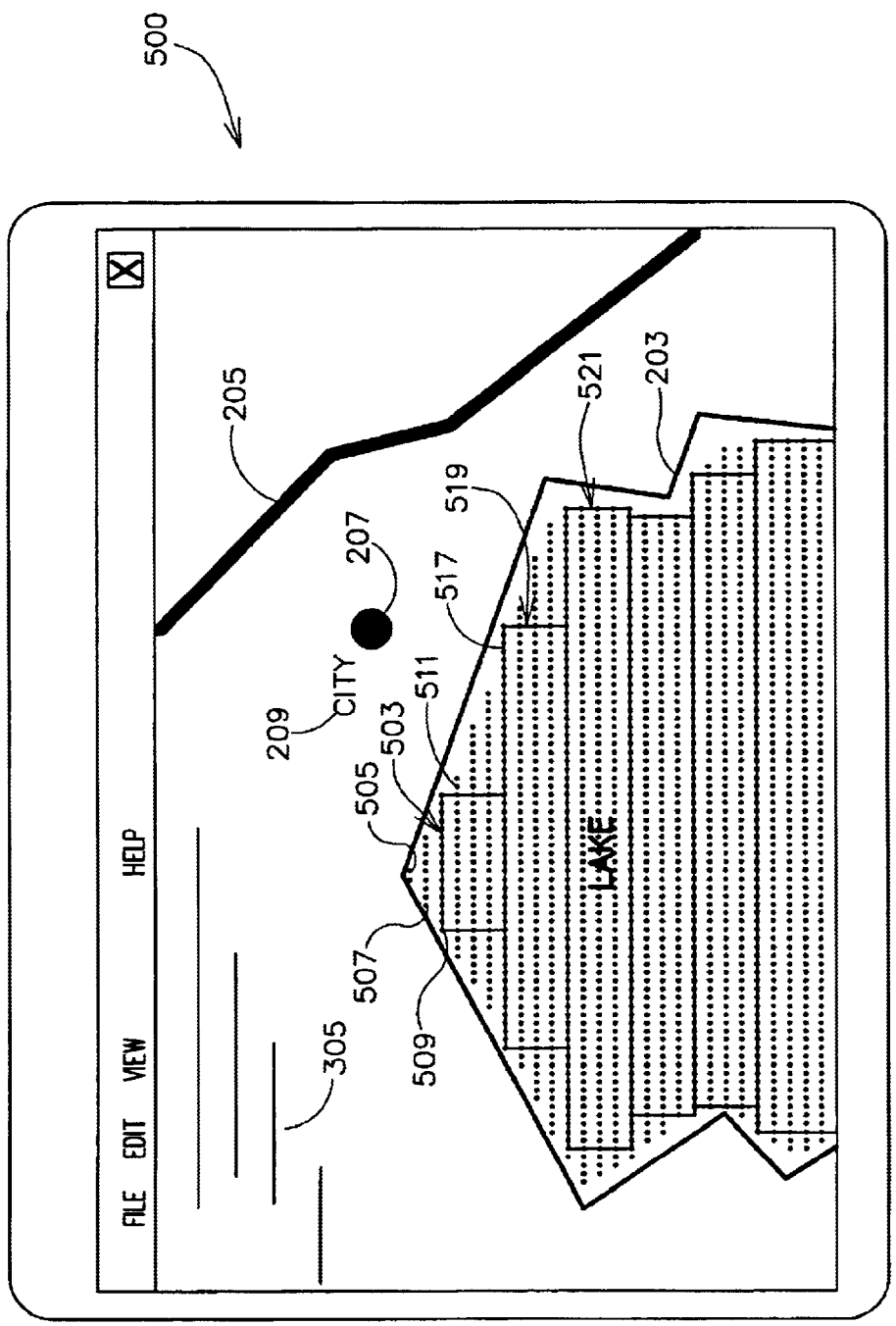
FIG. 5 is a sample screen display illustrating the next step in the procedure for generating potential label positions for the polygon.

FIG. 5 is a sample screen display 500 presented by the mapping program 37 illustrating the next step in the procedure for generating potential label positions for the lake 203. After each of the horizontal lines within the lake 203 has been measured, the mapping program 37 begins generating potential label positions. A potential label position is generated by forming a rectangle, such as first rectangle 503, around portions of horizontal lines which overlap.

To support a potential label position, a horizontal line preferably must have sufficient length to support the width of the label. For instance, in the disclosed example, the first row of pixels, row 505, does not contain a horizontal line of sufficient length to support the width of the lake label 211. Accordingly, row 505 is not selected for use in a potential label position. Likewise, row 507 does not contain a horizontal line of sufficient length to support the width of the lake label 211. Therefore, row 507 is not selected for use in a potential label position. However, the third row of pixels, row 509, contains a horizontal line of sufficient length to support the width of the lake label 211. In accordance with this embodiment of the present invention, rows 505 and 507, under the present example, are not selected as preferable label positions due to their length as discussed. However, it should be understood that these rows are not discarded from use until after a final label position has been determined. For example, if the label "The Lake" must be placed in the lake feature, the mapping program 37 may, if necessary, split the label and place the word "The" on one line and the word "Lake" on a separate line. Also, if no rows of pixels are of sufficient length to support the label or components of the label, such as "The" and "Lake," the mapping program 37 may alternatively start the label inside the feature and allow it to run outside the border of the feature, such as the lake. Those skilled in the art will appreciate that the line-length necessary to support a label position is a function of the font size and width in characters of the label.

In addition to the length of the horizontal lines, a certain number of rows of pixels must contain a horizontal line in order to support a label position. In other words, there must be enough overlap between horizontal lines in successive rows of pixels that a rectangular box can be constructed of sufficient height to support a potential label position. The number of rows necessary to support a label position is a function of the font size of the label to be displayed. For example, a particular font size may require that fourteen rows of pixels all contain overlapping horizontal lines, while another font size may require fifteen rows. In the disclosed example, five successive rows are required to support a potential label position. Consequently, rectangle 503 is drawn to encompass five successive rows of pixels and extend the length of the shortest horizontal line, row 509, which will support a label position. Rectangle 503 then becomes the first potential label position.

The mapping program 37 then proceeds to the next row of pixels, row 517, below rectangle 503 to generate additional potential label positions. Those skilled in the art will appreciate that potential label positions for the lake 203 may overlap, and that another rectangle could be constructed beginning at the next row after row 509. In that case, a portion of rectangle 503 could be encompassed within another rectangle (not shown) having row 511 as its uppermost boundary and extending below rectangle 503 by one row of pixels. However, although the present invention envisions such an aspect, the disclosed embodiment forgoes overlapping label positions in exchange for the performance gains of having a more reasonable number of potential label positions. For that reason, the mapping program 37 constructs rectangle 503, and then proceeds to row 517.

At row 517, the mapping program 37 again verifies that the length of the horizontal line is sufficient to support a label position, and that a sufficient number of successive rows also contain overlapping horizontal lines of sufficient length. If those two criteria are established, then another rectangle is created. The result is rectangle 519 which becomes the second potential label position. The mapping program 37 continues evaluating each row of pixels until as many potential label positions are generated as can be viewed on the display 500. Once all the potential label positions are generated, a preferred label position is selected from the multiple potential label positions. Those skilled in the art will appreciate that there are many different schemes for choosing between potential label positions once the potential label positions are known. However, for simplicity of discussion, the disclosed embodiment selects the potential label position being the longest and closest to the center of the polygon. In this example, rectangle 521 is selected as the preferred label position.

Figure 6:
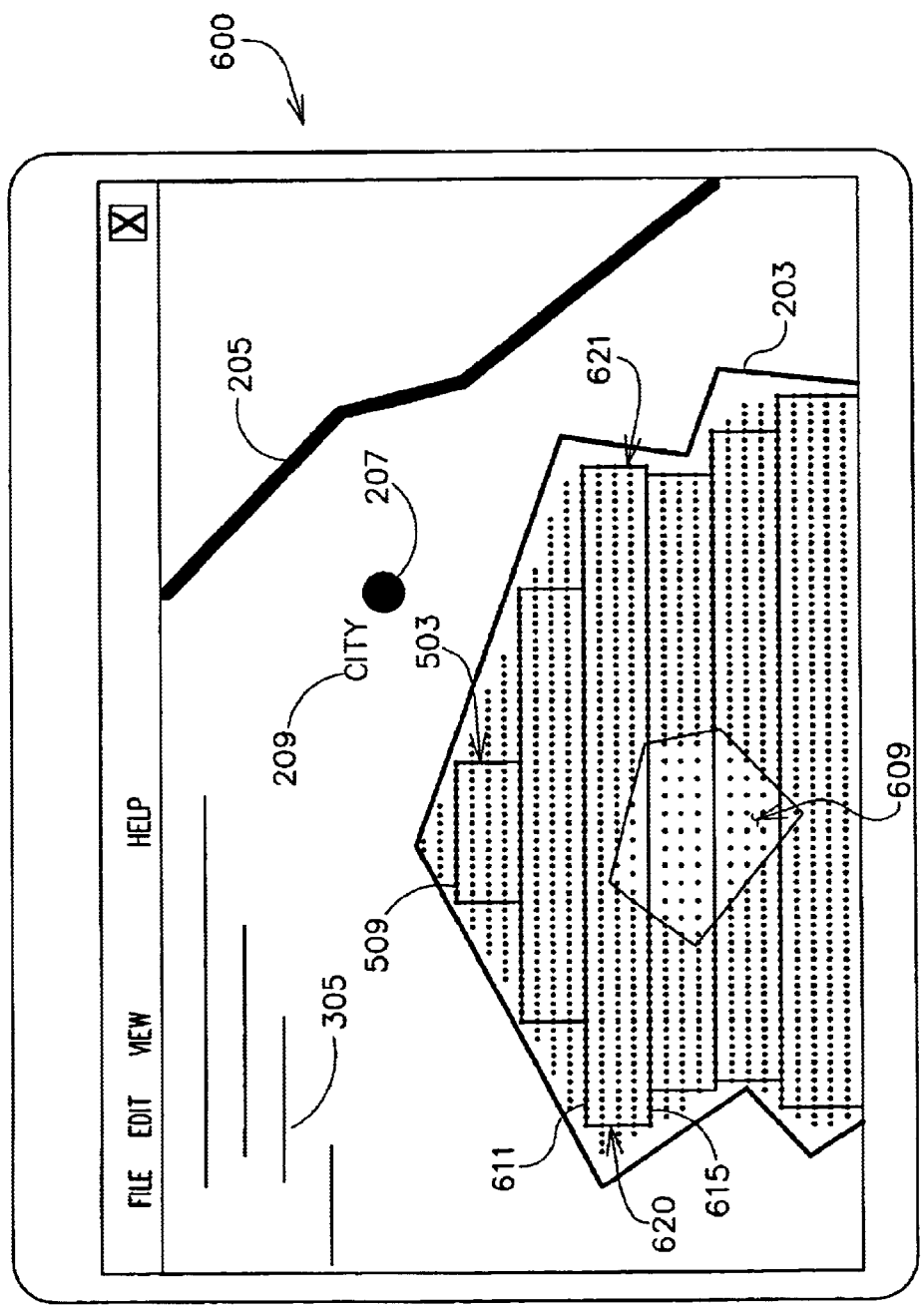
FIG. 6 further illustrates the ability of the disclosed embodiment to generate potential label positions based on the current view of the map.

FIG. 6 displays another example of generating potential label positions in accordance with the disclosed embodiment. FIG. 6 further illustrates the ability of the disclosed embodiment to generate potential label positions based on the current view of the map. As mentioned above regarding the previous example, the mapping program 37 evaluates each row of pixels within the lake 203 to create rectangles which support potential label positions. The mapping program 37 generates potential label positions based on shape of the area, such as the lake 203, shown in FIG. 6. The mapping program 37 ignores features within the area, such as the island 609, shown in FIG. 6, and the baselines or rows of pixels about which the rectangles are created are generated through the feature, such as the island 609. That is, the label placement locations are limited by the shape of the feature to be labeled, such as the lake 203, and are not limited by other features (e.g., island 609) located in the feature to be labeled. It should be understood, however, that when the preferred label position is selected, as discussed above, a label position preferably may be selected so that the label is not placed across a feature such as the island 609.

Another Exemplary Embodiment

Figure 7:
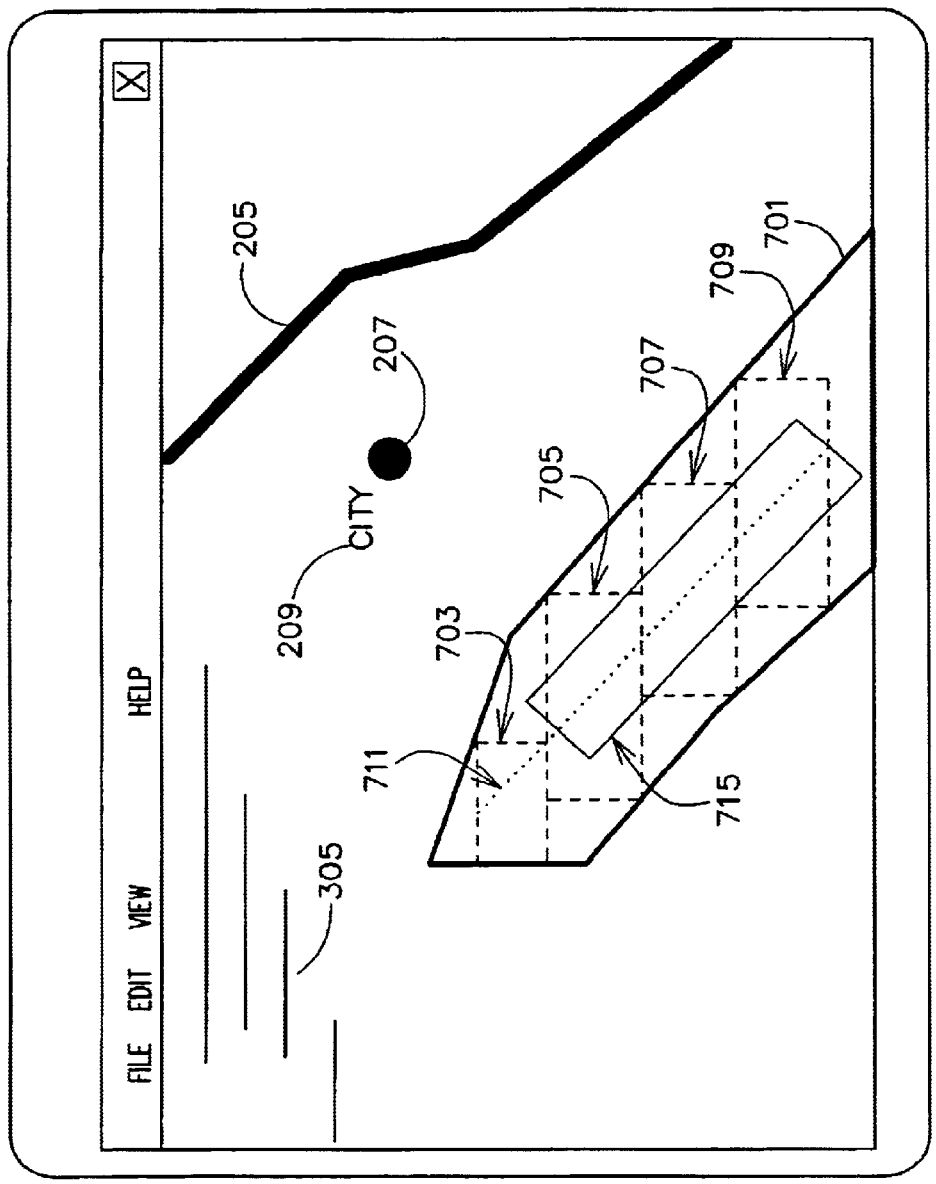
FIG. 7 is a sample display presented by another embodiment of the present invention which generates potential label positions at run time.

FIG. 7 is a sample display 700 presented by another embodiment of the present invention which generates potential label positions at run time. Depicted are the mountain range 305, the city 207, the city label 209, the road 205, and a second lake 701. In accordance with this embodiment, the mapping program 37 proceeds to generate potential label positions for the second lake 701 in a similar manner to that discussed above regarding the first embodiment. More specifically, the mapping program 37 creates rectangles 703, 705, 707, 709 by measuring horizontal lines (or baselines) on each row of pixels within the second lake 701. However, in this example, the mapping program 37 constructs another rectangle to use as a potential label position.

The mapping program 37 calculates a line 711 which intersects the centers of each of the rectangles 703, 705, 707, 709 constructed in the previous manner. It should be understood that the line 711 calculated by the mapping program 37 may be a curved line or a straight line, such as the line 711 in FIG. 7. In a typical case, the line 711 will not be a straight line as depicted in FIG. 7 because the map feature, such as the second lake 701, will be of such irregular shape that connecting the centers of the horizontal baselines from which the rectangles 703, 705, 707, 709 have been constructed yields a curved line that follows the form of the map feature, such as the second lake 701 shown in FIG. 7, to create a form following baseline about which rectangle 715 is constructed. It should be understood that for a form following baseline, such as line 711, more than one rectangle 715 typically is constructed to follow the form of the line 711 so that individual characters comprising a label are oriented to follow the line 711. That is, a set of rectangles 715 typically are constructed along the form following line 711 for the placement of a label. The single rectangle 715 shown in FIG. 7 is for illustrative purposes only.

After the line 711 is constructed, it may then be smoothed by the mapping program 37 to give an eye pleasing form about which the rectangle 715 is constructed. In this manner, the mapping program 37 is able to construct a potential label position which may be cartographically preferred for certain polygons, such as the slender diagonal polygon used to illustrate the second lake 701. As with the previous examples, a preferred label position is finally selected from the potential label positions.

Figure 8:
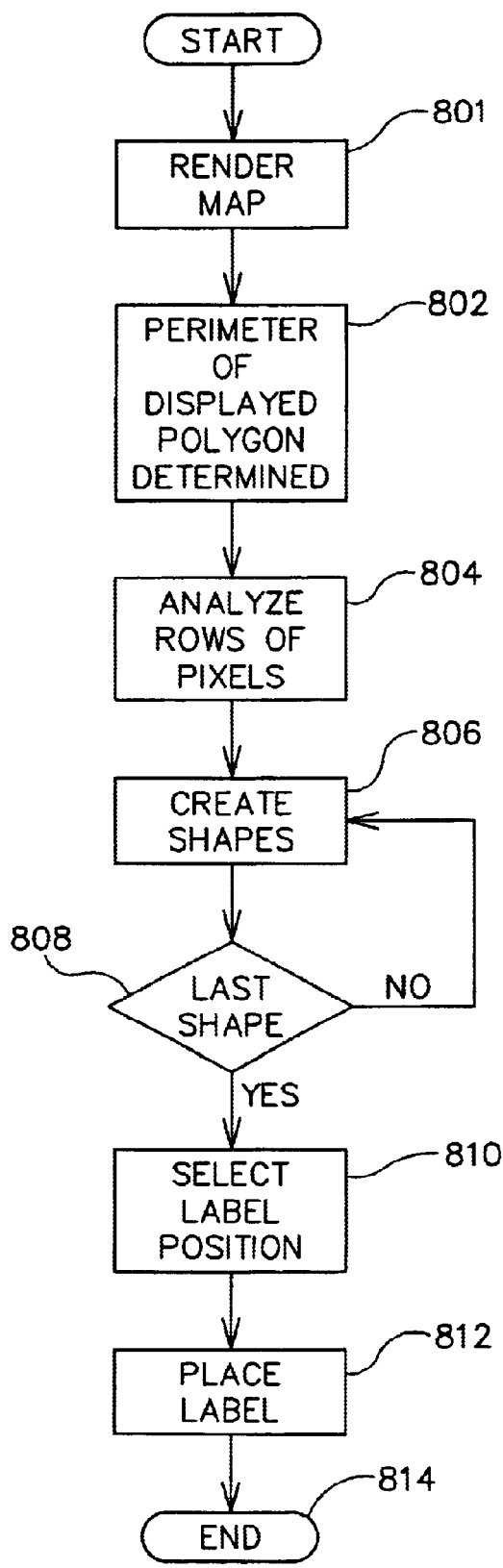
FIG. 8 is a logical flow diagram illustrating steps performed by an embodiment of the present invention to generate potential label positions for a polygon.

FIG. 8 is a flow chart depicting steps performed by a process 800 for implementing an exemplary embodiment of the present invention. The process 800 begins at step 801 where the mapping program 37 is rendering a map to a display. The process 800 proceeds to step 802, where the mapping program 37 begins to generate potential label positions for a polygon displayed on the screen.

At step 802, the perimeter of the displayed portion of the polygon is determined. Based on the current view of the map being displayed, all of the polygon may not be visible. Accordingly, the process begins generating potential label positions by first identifying the portion of the polygon that is visible. In this manner, the potential label positions generated are tailored to the particular view of the map currently being displayed, rather than simply being preconfigured positions on the polygon. Dynamically generating potential label positions typically results in a more aesthetically pleasing or cartographically preferable map. Processing then proceeds at step 804.

At step 804, each row of pixels within the polygon is examined to determine the lengths and beginning positions of horizontal lines on each row. The lengths of each horizontal line on each row of pixels is measured. The lengths and beginning positions of each horizontal line on each row are maintained for later evaluation. Processing then proceeds at step 806.

At step 806, a shape is created such that it encloses an area filled with horizontal lines. In other words, the shape is constructed to span the width of a series of horizontal lines on successive rows of pixels, and as many rows of pixels as are necessary to display the label. Shapes that are of sufficient height and width to support the label are identified as potential label positions.

In the disclosed embodiment, the shape is a rectangle because labels are typically rectangular. Those skilled in the art will appreciate that the shape may be any shape which is of sufficient size to contain the label. The size of the shape is driven by the desired size of the label. The width of the shape should exceed a minimum width required to display the label, and the height of the shape should at least equal the desired height of the label.

Processing then continues at decision step 808, where a determination is made whether the shape just constructed is the last possible label position. If there are sufficient rows of pixels remaining below the shape just constructed to accommodate additional shapes, then processing returns to step 806, and the process continues creating shapes. If there are not sufficient rows of pixels remaining below the shape just constructed to accommodate additional shapes, then processing continues to step 810.

At step 810, the process has completed creating shapes which will support the placement of the label, and all the potential label positions have been selected. Consequently, a preferred label position is selected from the potential label positions. Those skilled in the art are familiar with many various means for selecting a preferred label position from multiple potential label positions. In the disclosed embodiment, the potential label position being the closest to the center of the polygon is selected as the preferred label position. Processing then continues at step 812 where the label is displayed in the preferred label position, and processing terminates at finishing step 814.

Other embodiments of the present invention will become readily apparent to those skilled in the art from a review of this detailed description in conjunction with the attached drawings. The disclosed embodiments are but examples of many alternative embodiments which will become readily apparent upon a close examination of the teachings of the present invention. From a reading of the above description pertaining to the disclosed embodiments, other modifications and variations thereto will become apparent to those skilled in the art. Therefore, the scope of the present invention is to be limited only by the following claims.

What is claimed is:

1. A computer-readable medium having computer-executable instructions for generating a potential label position for a label on a computer-generated map, which when executed, performs steps, comprising:
   in response to one of producing the computer-generated map;
   determining an entire visible and displayed portion of a polygon comprising a perimeter of a geographic object on the computer-generated map on a display device, the polygon being one of fully displayed and partially displayed on the display device;
   determining the length and beginning position of a plurality of horizontal lines within the entire portion of the polygon that is visible on the display device;
   creating a rectangular shape which is filled with at least some of the plurality of horizontal lines and being contained within the visible and displayed portion of the polygon, the width of the rectangular shape being related to the width of the label, the height of the rectangular shape being related to the height of the label; and
   selecting the shape as the potential label position, the potential label position comprising a location wherein the entire label is visible on the display device.

2. The computer-readable medium of claim 1, further comprising computer-executable instructions which, when executed, perform steps comprising:
   repeating the step of creating the rectangular shape until substantially all of the horizontal lines within the polygon are at least partially contained within at least one rectangular shape; and
   selecting each of the rectangular shapes as one of a plurality of potential label positions.

3. The computer-readable medium of claim 2, further comprising computer-executable instructions which, when executed, perform steps comprising:
   identifying one of the plurality of potential label positions as a preferred label position; and
   placing the label in the preferred label position.

4. The computer-readable medium of claim 1, further comprising computer-executable instructions which, when executed, perform steps comprising:
   identifying a line through each of the rectangular shapes created, the line extending through substantially the entire visible portion of the polygon; and
   creating an alternative shape, one axis of the shape being substantially collinear with the line.

5. The computer-readable medium of claim 4, wherein the line is curved.

6. The computer-readable medium of claim 4, wherein the line is straight.

7. A system for generating a potential label position for a label on a computer-generated display screen, comprising:
   a control module operative,
      in response to one of producing a computer-generated map for a first instance on the display screen and changing a view of the computer-generated map;
      to determine an entire visible and displayed portion of a polygon comprising a perimeter of a geographic object of the computer-generated map on the display device, the polygon being one of fully displayed and partially displayed on the display device;
      to determine the length and beginning position for a plurality of horizontal lines within the entire portion of the polygon that is visible on the display screen;
      to create a rectangular shape which is filled with at least some of the plurality of horizontal lines and being contained within the visible and displayed portion of the polygon the width of the rectangular shape being related to the width of the label, the height of the rectangular shape being related to the height of the label;
      to select the rectangular shape as the potential position, the potential label position comprising a location wherein the entire label is visible on the display screen;
      to identify the potential label position and the preferred label position; and
      to place the label in the preferred label position.

8. A computer-readable medium having computer-executable instructions for generating a potential label position for a label on a display screen, which, when executed, performs steps, comprising:
   in response to a change in a view of the computer-generated map, determining an entire visible and displayed portion of a polygon comprising an outline of a geographic object of the computer-generated map on the display screen, the polygon being one of fully displayed and partially displayed on the display screen;
   analyzing the entire portion of the polygon that is visible on the display screen to construct a plurality of potential label positions which support the label based on a size of the label and which are located within the polygon and such that an entire label is visible on the display screen without any clipping of the label, wherein analyzing comprises identifying a row of pixels contained within the visible portion of the polygon and creating a shape which is filled with a portion of the row of pixels, at least one dimension of the shape being related to the size of the label;

selecting from the plurality of potential label positions a preferred label position for placement of the label; and placing the label in the preferred label position.

9. The computer-readable medium of claim 8, wherein the step of analyzing the visible portion of the polygon further comprises selecting the shape as the potential label position.

10. The computer-readable medium of claim 9, wherein the step of identifying a row of pixels is repeated for every row of pixels contained within the visible portion of the polygon, and wherein at least a second row of pixels succeeds the row of pixels.

11. The computer-readable medium of claim 9, wherein the step of evaluating each pixel in the row of pixels comprises:

determining a length and beginning position for a horizontal line along the row of pixels; and maintaining in memory the length and beginning position for the horizontal line.

12. A computer-implemented method for generating potential label positions comprising the steps of:

in response to a change in a view of a computer-generated map, determining an entire visible and displayed portion of a polygon comprising a perimeter of a geographic object of the computer-generated map on the display device, the polygon being one of fully displayed and partially displayed on the display device;

analyzing the entire portion of the polygon that is visible on the display device to identify lengths of pixels contained within the polygon;

selecting successive rows of lengths of pixels which overlap such that a rectangle is formed to encompass the pixels, the rectangle being of sufficient height to display a label, the rectangle being of sufficient width to display the label;

repeating the step of selecting successive rows of lengths of pixels until multiple rectangles are formed;

identifying each of the rectangles as a potential label position, each potential label position comprising a location when the entire label is visible on the display device;

selecting one of the multiple potential label positions as a preferred label position; and placing the label in the preferred label position.

13. The system of claim 7, wherein the control module is further operative:

to create a plurality of shapes that are filled with at least some of the plurality of horizontal lines, the width of each shape being related to the width of the label, the height of each shape being related to the height of the label; and to select a shape from one of the plurality of shapes as the potential label position, the potential label position comprising a location wherein the entire label is visible on the display screen.

14. The system of claim 7, wherein the control module is further operative:

to create a plurality of rectangles by measuring horizontal lines on each row of pixels within the polygon;

to calculate a connection line which intersects geometric centers of each rectangle; and to smooth the connection line if the connection line is not straight.

15. The system of claim 7, wherein the control module is further operative:

to identify a row of pixels contained with the visible portion of the polygon;

to create a rectangular shape which is filled with a portion of the row of pixels, wherein at least two dimensions of the rectangular shape are related to the size of the label; and selecting the rectangular shape as the potential label position.

16. The system of claim 7, wherein the control module is further operative to maintain in memory the beginning position and length for each horizontal line.

17. The system of claim 7, wherein the control module is further operative to identify a potential label position as the preferred label position by selecting a label position having a maximum length and being closest to a geometric center of the polygon.

18. The computer-readable medium of claim 1, wherein the geographic object comprises one of an island, a lake, and a river.

19. The system of claim 7, wherein the geographic object comprises one of an island, a lake, and a river.

20. The computer-readable medium of claim 8, wherein the geographic object comprises one of an island, a lake, and a river.

* * * * *